(12) United States Patent
Chang (10) Patent No.: US 9,381,833 B2
(45) Date of Patent: Jul. 5, 2016

(54) RECLINING APPARATUS FOR VEHICLE SEAT

(71) Applicant: Hyundai Dymos Incorporated, Seosan, Chungcheongnam-Do (KR)

(72) Inventor: Seung Hun Chang, Gyeonggi-Do (KR)

(73) Assignee: Hyundai Dymos Incorporated, Seosan, Chungcheongnam-do (KR)

( * ) Notice: Subject to any disclaimer, the term of this patent is extended or adjusted under 35 U.S.C. 154(b) by 65 days.

(21) Appl. No.: 14/383,855

(22) PCT Filed: Mar. 6, 2013

(86) PCT No.: PCT/KR2013/001784
§ 371 (c)(1),
(2) Date: Nov. 4, 2014

(87) PCT Pub. No.: WO2013/133616
PCT Pub. Date: Sep. 12, 2013

(65) Prior Publication Data
US 2015/0054324 A1 Feb. 26, 2015

(30) Foreign Application Priority Data
Mar. 6, 2012 (KR) ................... 10-2012-0022766

(51) Int. Cl.
*B60N 2/02* (2006.01)
*B60N 2/225* (2006.01)

(52) U.S. Cl.
CPC ............ *B60N 2/2252* (2013.01); *B60N 2/2254* (2013.01)

(58) Field of Classification Search
CPC .................... B60N 2/2252; B60N 2/2254

USPC ......................................................... 297/362
See application file for complete search history.

(56) References Cited

U.S. PATENT DOCUMENTS 4,884,844 A   12/1989  Kershaw et al.
7,384,101 B2   6/2008  Kawashima et al.
(Continued)

FOREIGN PATENT DOCUMENTS

CN    1799452 A       7/2006
DE    3129672 C1  * 10/1982  ........... B60N 2/2252
(Continued)

OTHER PUBLICATIONS

European Search Report for European Patent Application No. 13758427.2, issued Oct. 20, 2015, 6 pages.
(Continued)

*Primary Examiner* — Laurie K Cranmer
(74) *Attorney, Agent, or Firm* — Mintz Levin Cohn Ferris Glovsky and Popeo, P.C.; Peter F. Corless (57) ABSTRACT

The present invention relates to a reclining apparatus for a vehicle seat, including: a gear plate configured to be connected to a seat cushion and have an external gear formed on an outer circumference thereof and a coupling protrusion provided along a circumference thereof having a rotating radius smaller than that of the external gear; a mobile flange configured to be connected to the seat back, have an internal gear formed on an inner circumference thereof, and eccentrically engaged with the external gear; and an operating unit configured to be provided in an operation space between a center hole of the gear plate and a center hole of the mobile flange to make the mobile flange be relatively rotated to the gear plate while being eccentric to the gear plate.

4 Claims, 6 Drawing Sheets

(56) References Cited

U.S. PATENT DOCUMENTS

| | | | |
|---|---|---|---|
| 7,513,572 B2 * | 4/2009 | Kawashima | B60N 2/2252 297/362 |
| 8,262,165 B2 * | 9/2012 | Mitsuhashi | B60N 2/2252 297/362 |
| 8,672,408 B2 * | 3/2014 | Legras | B60N 2/2255 297/361.1 |
| 8,720,998 B2 * | 5/2014 | Stilleke | B60N 2/2252 297/362 |
| 8,905,479 B2 * | 12/2014 | Lehmann | B60N 2/2252 297/362 |
| 9,096,152 B2 * | 8/2015 | Zynda | B60N 2/2252 |
| 2006/0158013 A1 * | 7/2006 | Kawashima | B60N 2/2252 297/362 |
| 2011/0193391 A1 | 8/2011 | Mitsuhashi | |

FOREIGN PATENT DOCUMENTS

| | | |
|---|---|---|
| EP | 1676742 A1 | 7/2006 |
| JP | 2002-065388 A | 3/2002 |
| JP | 2008-206925 A | 9/2008 |
| KR | 10-2009-0017775 A | 2/2009 |
| KR | 10-1003718 B1 | 12/2010 |
| KR | 10-2011-0102647 A | 9/2011 |
| WO | 2010/102413 A1 | 9/2010 |
| WO | 2012/001769 A1 | 1/2012 |

OTHER PUBLICATIONS

Chinese Office Action for Chinese Patent Application No. 201380023260.4, dated Dec. 3, 2015, English translation, 8 pages.

* cited by examiner

RECLINING APPARATUS FOR VEHICLE SEAT

CROSS-REFERENCE TO RELATED APPLICATIONS

This application is a U.S. national phase application, pursuant to 35 U.S.C. §371, of PCT/KR2013/001784, filed Mar. 6, 2013, designating the United States, which claims priority to Korean Application No. 10-2012-0022766, filed Mar. 6, 2012. The entire contents of the aforementioned patent applications are incorporated herein by this reference

TECHNICAL FIELD

The present invention relates to a reclining apparatus for a vehicle seat, and more particularly, to a reclining apparatus for a vehicle seat capable of reducing a weight and cost of a gear plate by changing a formation position of a coupling protrusion and a method for forming a coupling protrusion and preventing components from separating by covering an operating unit.

BACKGROUND ART

A seat provided in a vehicle is configured to include a seat back supporting a lower body of a passenger, a seat cushion supporting a lower body of the passenger such as hips, thighs, and the like, and a head rest supporting the back of a head of the passenger, wherein a reclining apparatus enabling adjustment of an angle of the seat back with respect to the seat cushion is mounted at a portion at which the seat back and the seat cushion are connected to each other.

As the reclining apparatus, there are a manual type reclining apparatus adjusting an angle of the seat back by a lever manipulation by the passenger and a power type reclining apparatus automatically operated by power of a motor through a switch manipulation.

The reclining apparatuses generally include components coupled with the seat back and components coupled with the seat cushion independent of an operation scheme, and the components coupled with the seat back may be relatively rotated to the components coupled with the seat cushion to adjust the angle of the seat back.

Figure 1:
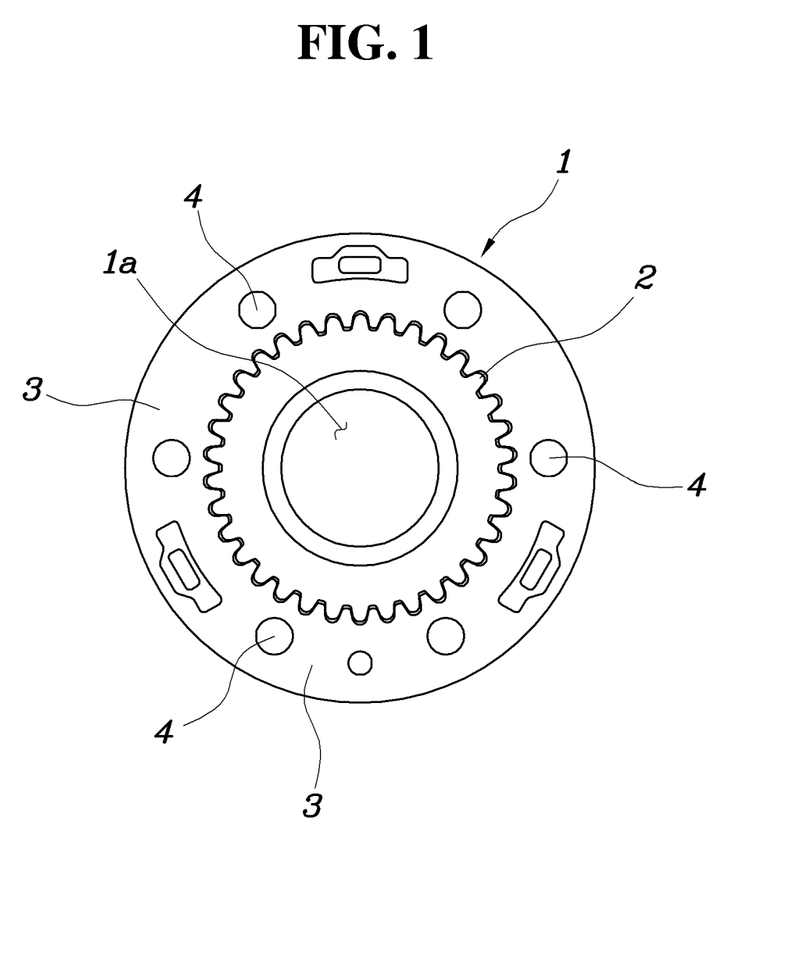
FIG. 1 is a diagram illustrating a shape of a gear plate according to the related art.

FIG. 1 is a diagram illustrating a gear plate 1 which is a component coupled with the seat cushion, in which a center of the gear plate is provided with a center hole 1a and an external gear 2 is protrudedly formed around the center hole 1a.

Further, a flange part 3 is formed around the external gear 2 and a plurality of coupling protrusions 4 are coupled with the flange part 3 by welding so that the gear plate 1 may be coupled with the seat cushion (not illustrated). In this case, the external gear 2 may be protrudedly formed on one surface of the gear plate 1 and the coupling protrusion 4 may be protrudedly formed on the other surface of the gear plate 1.

Further, although not illustrated in the drawings, as a component coupled with the seat back, a mobile flange is provided. An inside of the mobile flange is provided with an internal gear and an operating unit for eccentrically rotating the mobile flange is provided between the gear plate and the mobile flange. That is, the mobile flange is rotated while the external gear on the gear plate being engaged with the internal gear, such that the seat back coupled with the mobile flange is rotated to adjust the angle of the seat back.

However, in the case of the above-mentioned gear plate, since the coupling protrusion is positioned at an edge portion of the external gear, the flange part needs to be provided around the external gear to form the coupling protrusion. In this case, since the flange part is provided along the edge of the external gear, it is very difficult to reduce a weight of the gear plate due to the flange part.

Further, since the coupling protrusion is coupled with the flange part by the welding, man hour may be increased and production and manufacturing costs of components may be increased.

Further, since the operating unit provided between the gear plate and the mobile flange is configured to be exposed to the outside, components configuring the operating unit may be separated.

The contents described as the related art have been provided only for assisting in the understanding for the background of the present invention and should not be considered as corresponding to the related art known to those skilled in the art.

SUMMARY

An object of the present invention is to provide a reclining apparatus for a vehicle seat capable of reducing a weight and cost of a gear plate by changing a formation position of a coupling protrusion and a method for forming a coupling protrusion.

Another object of the present invention is to provide a reclining apparatus for a vehicle seat capable of preventing components from separating by covering an operating unit.

In one general aspect, a reclining apparatus for a vehicle seat includes: a gear plate configured to be connected to a seat cushion, have an external gear formed on an outer circumference thereof, and have a coupling protrusion provided along a circumference thereof having a rotating radius smaller than that of the external gear; a mobile flange configured to be connected to the seat back, have an internal gear formed on an inner circumference thereof, and eccentrically engaged with the external gear; and an operating unit configured to be provided in an operation space between a center hole of the gear plate and a center hole of the mobile flange to make the mobile flange be relatively rotated to the gear plate while being eccentric to the gear plate.

The coupling protrusion may be formed along a minimum rotating radius adjacent to the center hole of the gear plate.

The other surface of the gear plate may be provided with a lightweight groove at a position corresponding to the coupling protrusion formed on one surface of the gear plate.

The coupling protrusion may be integrally formed with the gear plate.

One surface of the gear plate may be provided with a cap in a shape covering the operating unit to prevent the operating unit from separating.

A locking jaw may be formed along an edge of the cap and the coupling protrusion may protrude toward an inside of the center hole of the gear plate to make the locking jaw be locked to a protruded portion of the coupling protrusion.

As described above, according to the exemplary embodiments of the present invention, the coupling protrusion on the gear plate is provided along the inside circumference of the external gear, and as a result, the separate flange part for securing the formation position of the coupling protrusion is not required, thereby simplifying and minimizing the structure of the gear plate and implementing the miniaturization and weight reduction of the components.

Further, the coupling protrusion is integrally formed with the gear plate to reduce the man hour required to form the coupling protrusion, thereby greatly saving the production and manufacturing cost of the gear plate and the cap is formed on the outside of the operating unit in a shape covering the operating unit, thereby effectively preventing the spring and the cams from separating to the outside.

DETAILED DESCRIPTION

Exemplary embodiments of the present invention will be described below in detail with reference to the accompanying drawings.

Referring to FIGS. 2 to 6, a reclining apparatus for a vehicle seat according to an exemplary embodiment of the present invention may include a gear plate 10 configured to be connected to a seat cushion (not illustrated), have an external gear 12 formed on an outer circumference thereof, and have a coupling protrusion 13 provided along a circumference thereof having a rotating radius smaller than that of the external gear 12, a mobile flange 20 configured to be connected to the seat back (not illustrated), have an internal gear 22 formed on an inner circumference thereof, and eccentrically engaged with the external gear 12, and an operating unit 30 configured to be provided in an operation space between a center hole 11 of the gear plate 10 and a center hole 21 of the mobile flange 20 to make the mobile flange 20 be relatively rotated to the gear plate 10 while being eccentric to the gear plate 10.

Referring in detail to FIGS. 2 to 5, the gear plate 10 is first coupled with the seat cushion through a bracket, and the like, a center thereof is provided with the center hole 11, an outer circumference thereof is provided with the external gear 12, and one surface thereof is provided with a plurality (four in the present invention) of coupling protrusions 13 so as to be coupled with the seat cushion.

In this case, the external gear 12 may be provided along an outer circumference of an outermost portion of the gear plate 10 and the coupling protrusion 13 may be provided along a circumferential direction of the gear plate 10 between the external gear 12 and the center hole 11. Further, an inner circumference of the center hole 11 of the gear plate 10 may be further provided with a bush 15 and therefore a rotating operation of the operating unit 30 may be more smoothly implemented.

The mobile flange 20 is coupled with the seat back through the bracket, and the like and a center of the mobile flange 20 is provided with the center hole 21 and the mobile flange 20 has the internal gear 22 provided along an inner circumference of one side thereof to make the external gear 12 on the gear plate 10 be engaged with the internal gear 22. Further, the other side of the mobile flange 20 may be provided with a plurality of protrusions along a circumferential direction to be coupled with the seat back. Further, the mobile flange 20 may be coupled with a retainer 40 in a shape enclosing an outside of the mobile flange 20.

Figure 3:
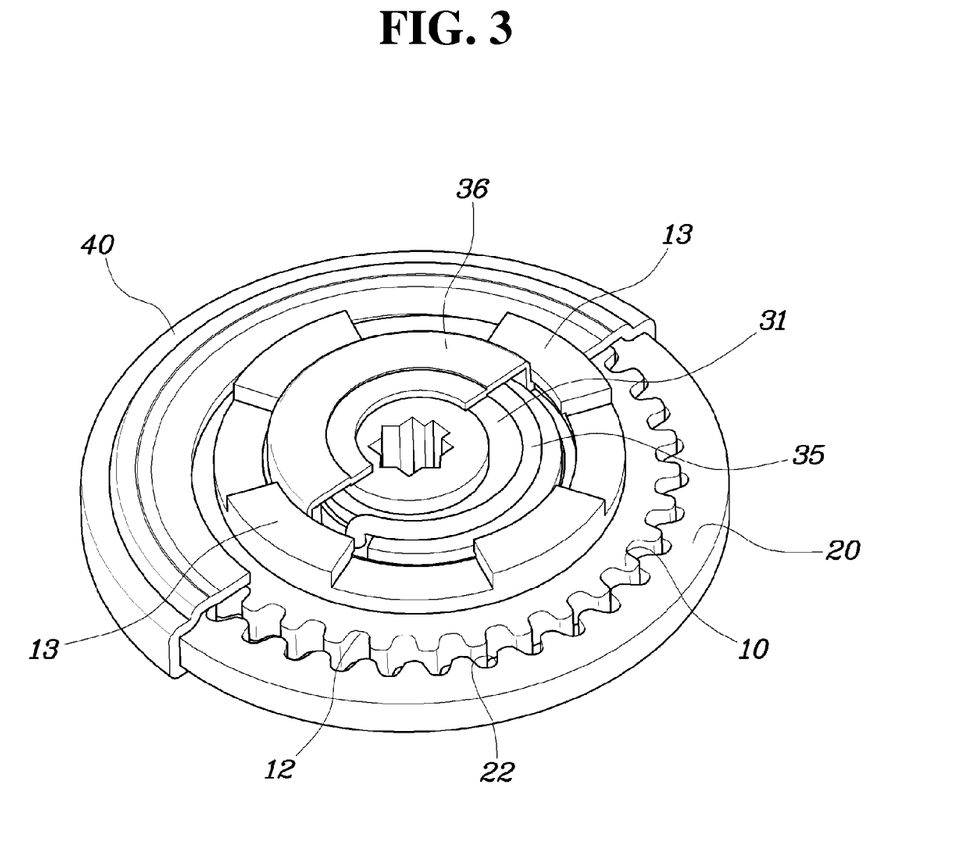
FIG. 3 is a perspective view illustrating a coupled configuration of the reclining apparatus according to the exemplary embodiment of the present invention.

Here, as illustrated in FIG. 3, the number of teeth of the external gear 12 of the gear plate 10 is one smaller than the number of teeth of the internal gear 22 of the mobile flange 20. Further, a diameter of the external gear 12 is formed to be smaller than that of the internal gear 22 and thus the mobile flange 20 is eccentrically engaged with the gear plate 10 to be eccentrically rotated.

Figure 2:
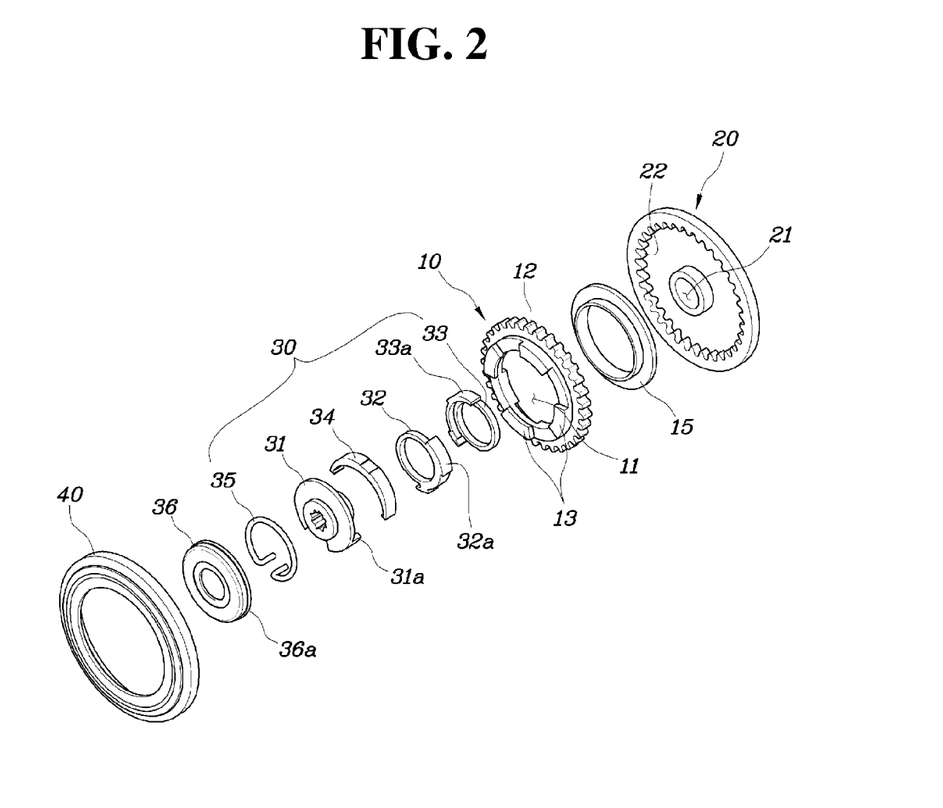
FIG. 2 is a diagram separately illustrating components configuring a reclining apparatus according to an exemplary embodiment of the present invention.
Figure 4:
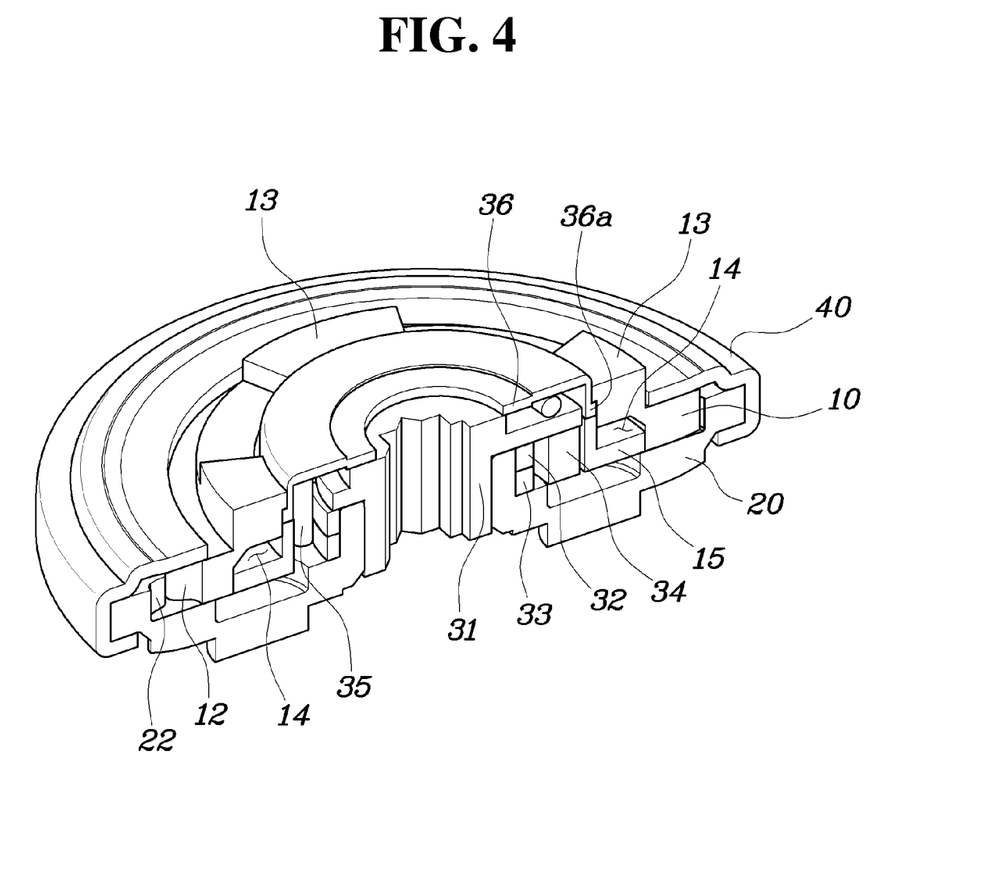
FIG. 4 is a cut-away perspective view of the reclining apparatus according to the exemplary embodiment of the present invention.

As illustrated in FIGS. 2 and 4, the operating unit 30 is disposed in the operation space between the gear plate 10 and the mobile flange 20 and is configured to largely include an input shaft 31, a first cam 32, a second cam 33, a third cam 34, and a spring 35.

As described below, the first cam 32 and the second cam 33 are formed in a ring shape so that one surface of the first cam 32 overlaps the other surface of the second cam 33 and an outer circumference of the first cam 32 is provided with a first locking part 32a and an outer circumference of the second cam 33 is provided with a second locking part 33a to be rotatably inserted between the center hole 11 of the gear plate 10 and the center hole 21 of the mobile flange 20.

That is, one end of the first locking part 32a faces one end of the second locking part 33a and the other end of the first locking part 32a and the other end of the second locking part 33a overlap each other to face each other, such that the first cam 32 and the second cam 33 are applied with a relative rotating force to be rotated between the center hole 11 of the gear plate 10 and the center hole 21 of the mobile flange 20.

Further, the third cam 34 is formed to have approximately a semi-spherical shape and an inner circumference of the third cam 34 is coupled with the first cam 32 and the second cam 33 while partially enclosing outer circumferences of the first cam 32 and the second cam 33. That is, one end of the third cam 34 is coupled with an outer circumference of the first locking part 32a formed on the first cam 32 and the other end of the third cam 34 is coupled with an outer circumference of the second locking part 33a formed on the second cam 33, such that the first cam 32 and the second cam 33 may be rotated together with the third cam 34.

In this case, the operation space between the center hole 11 of the gear plate 10 and the center hole 21 of the mobile flange 20 is provided in an eccentric form and therefore the coupled form of the first cam 32, the second cam 33, and the third cam 34 needs to be configured and assembled in an eccentric form which may be rotated while being inserted into the operation space of the eccentric form.

Further, the center hole 21 of the mobile flange 20 is rotatably inserted with the input shaft 31 and one end of the input shaft 31 is provided with an operation piece 31a protruding to the cam side and the operation piece 31a is configured to be locked between the second cam 33 and the third cam 34, and thus the first cam 32, the second cam 33, and the third cam 34 may be rotated by rotating the input shaft 31.

Further, one surface of the input shaft 31 is seated with a spring 35 having a torsion spring shape and both ends of the spring 35 are inserted into a space in which one end of the first cam 32 faces one end of the second cam 33 to provide an elastic force which simultaneously rotates the first cam 32 and the second cam 33. In this case, a center of the input shaft 31 may be provided with a shaft hole having a spline shape so that an actuator may be coupled with a rotating shaft.

Figure 6:
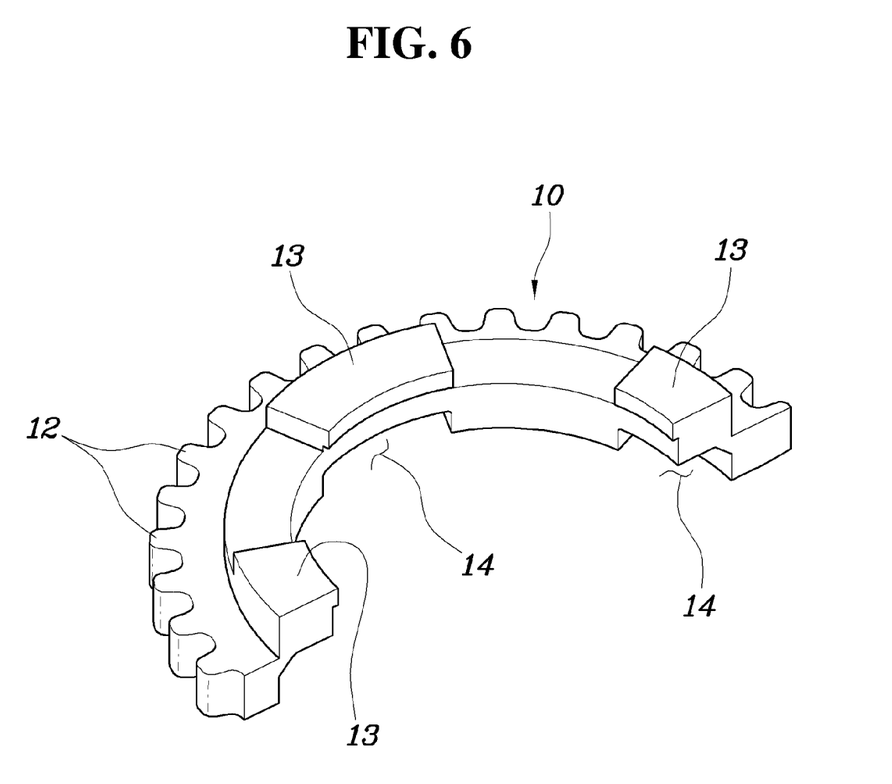
FIG. 6 is a cut-away perspective view of a gear plate according to an exemplary embodiment of the present invention.

Meanwhile, according to the exemplary embodiment of the present invention, as illustrated in FIGS. 2 and 6, the coupling protrusion 13 may be formed along a minimum rotating radius adjacent to the center hole 11 of the gear plate 10.

That is, the coupling protrusion 13 is formed along an edge between the center hole 11 of the gear plate 10 and the external gear 12 and is formed along the minimum rotating radius adjacent to the center hole 11 to minimize the diameter of the coupling protrusion 13, such that the weight reduction of the gear plate 10 provided with the coupling protrusion 13 is very effective.

According to the exemplary embodiment of the present invention, the other surface of the gear plate 10 may be provided with a lightweight groove 14 at a position corresponding to the coupling protrusion 13 formed on one surface of the gear plate 10.

That is, one surface opposite to the mobile flange 20 side is protrudedly provided with the coupling protrusion 13 and the other surface toward the mobile flange 20 side is provided with the lightweight groove 14 as much as the protrusion of the coupling protrusion 13 to more reduce the weight of the gear plate 10.

According to the exemplary embodiment of the present invention, the coupling protrusion 13 may be integrally formed with the gear plate 10, and therefore the coupling protrusion 13 and the gear plate 10 are integrally processed during the manufacturing process of the gear plate 10 to reduce the man hour required to form the coupling protrusion 13 and save the production and manufacturing costs of the components of the gear plate 10. Further, compared to the coupling protrusion 4 fixed by the existing welding processing, the coupling force and durability of the coupling protrusion 13 may be more increased.

Figure 5:
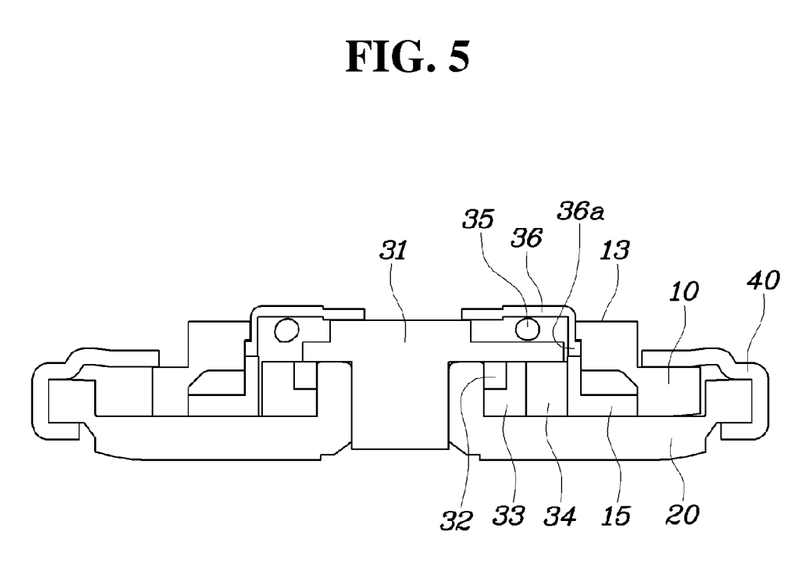
FIG. 5 is a cut-away front view of the reclining apparatus according to the exemplary embodiment of the present invention.

Further, according to the exemplary embodiment of the present invention, as illustrated in FIGS. 2, 4, and 5, one surface of the gear plate 10 is provided with a cap 36 in a shape covering the operating unit 30 to prevent the operating unit 30 from separating.

To this end, a locking jaw 36a is formed along an edge of the cap 36 and the coupling protrusion 13 protrudes toward the inside of the center hole 11 of the gear plate 10 to make the locking jaw 36a be locked to a protruded portion of the coupling protrusion 13.

That is, the coupling protrusion 13 protrudes toward the inside of the center hole 11 of the gear plate 10, and therefore the locking jaw 36a formed at the edge of the cap 36 is coupled with the coupling protrusion 13 in a form inserted into the protruded portion of the coupling protrusion 13 to prevent the spring 35 and the cam from separating by the cap 36.

Here, when the cap 36 is coupled with the coupling protrusion 13, the locking jaw 36a formed on the cap 36 is configured to be supported by the bush 15 and therefore the locking jaw 36a may be stably inserted between the coupling protrusion 13 and the bush 15.

The action and effect of the present invention will be described in detail with reference to FIGS. 2 and 4.

When the actuator of the power reclining apparatus is driven by the switch manipulation, the input shaft 31 starts to be rotated to provide an elastic force to the spring 35.

Next, when the first cam 32 or the second cam 33 is rotated by the elastic force of the spring 35, the first cam 32 and the second cam 33 are coupled with the third cam 34 and thus the third cam 34 is rotated together with the first cam 32 and the second cam 33. In this case, the third cam 34 is eccentrically formed and therefore is eccentrically rotated between the center hole 11 of the gear plate 10 and the center hole 21 of the mobile flange 20.

Therefore, the external gear 12 of the gear plate 10 is eccentrically engaged with the internal gear 22 of the mobile flange 20 and thus the mobile flange 20 is eccentrically rotated to the gear plate 10, such that the seat back coupled with the mobile flange 20 is rotated, thereby adjusting the angle of the seat back.

As such, according to the reclining apparatus for a vehicle seat according to the exemplary embodiment of the present invention, the mobile flange 20 coupled with the seat back is rotatably engaged with the gear plate 10 to adjust the angle of the seat back depending on the rotating manipulation of the mobile flange 20.

In particular, according to the exemplary embodiment of the present invention, the coupling protrusion 13 on the gear plate 10 is formed along an inside circumference of the external gear 12 and thus the separate flange part need not be formed at the outside of the external gear 12 to form the coupling protrusion 13, such that the structure of the gear plate 10 may be simplified and minimized, thereby reducing the weight of the gear plate 10 to realize the weight reduction of the components.

Further, according to the exemplary embodiment of the present invention, the coupling protrusion 13 is integrally formed with the gear plate 10 to reduce the man hour required to form the coupling protrusion 13, such that the production and manufacturing cost of the gear plate 10 may be greatly reduced.

In addition to this, according to the exemplary embodiment of the present invention, the outside of the operating unit 30 is provided with the cap 36 in a shape covering the operating unit 30 to effectively prevent the spring 35 and the cams from separating to the outside.

Meanwhile, although specific exemplary embodiments of the present invention have been described above in detail, it is obvious to those skilled in the art that various modifications and alterations may be made without departing from the spirit and scope of the present invention. In addition, it is obvious that these modifications and alterations are within the following claims.

| [Detailed Description of Main Elements] | |
| --- | --- |
| 10: GEAR PLATE | 11: CENTER HOLE |
| 12: EXTERNAL GEAR | 13: COUPLING PROTRUSION |
| 14: LIGHTWEIGHT GROOVE | 15: BUSH |
| 20: MOBILE FLANGE | 21: CENTER HOLE |
| 22: INTERNAL GEAR | 30: OPERATING UNIT |
| 31: INPUT SHAFT | 32: FIRST CAM |
| 33: SECOND CAM | 34: THIRD CAM |
| 35: SPRING | 36: CAP |
| 36a: LOCKING JAW | 40: RETAINER |

The invention claimed is:

1. A reclining apparatus for a vehicle seat, comprising:
a gear plate configured to be connected to a seat cushion, have an external gear formed on an outer circumference thereof, and have a coupling protrusion provided along a circumference thereof having a rotating radius smaller than that of the external gear;
a mobile flange configured to be connected to a seat back, have an internal gear formed on an inner circumference thereof, and eccentrically engaged with the external gear; and
an operating unit configured to be provided in an operation space between a center hole of the gear plate and a center hole of the mobile flange to make the mobile flange be relatively rotated to the gear plate while being eccentric to the gear plate, wherein one surface of the gear plate is provided with a cap in a shape covering the operating unit to prevent the operating unit from separating, and a locking jaw is formed along an edge of the cap and the coupling protrusion protrudes toward an inside of the center hole of the gear plate to make the locking jaw be locked to a protruded portion of the coupling protrusion.

2. The reclining apparatus for a vehicle seat of claim 1, wherein the coupling protrusion is formed along a minimum rotating radius adjacent to the center hole of the gear plate.

3. The reclining apparatus for a vehicle seat of claim 1, wherein the other surface of the gear plate is provided with a groove at a position corresponding to the coupling protrusion formed on one surface of the gear plate.

4. The reclining apparatus for a vehicle seat of claim 1, wherein the coupling protrusion is integrally formed with the gear plate.

* * * * *